United States Patent
Wang

(10) Patent No.: US 7,267,220 B2
(45) Date of Patent: Sep. 11, 2007

(54) DERAILLEUR DRIVE CHAIN STRUCTURE FOR DOWNHILL EVENT

(76) Inventor: Wen-pin Wang, No. 67, Kang Kou, Kang Nan Tsun, An Ting Hsiang, Tainan Hsien (TW)

( * ) Notice: Subject to any disclaimer, the term of this patent is extended or adjusted under 35 U.S.C. 154(b) by 0 days.

(21) Appl. No.: 11/312,750

(22) Filed: Dec. 21, 2005

(65) Prior Publication Data

US 2007/0137987 A1    Jun. 21, 2007

(51) Int. Cl.
*B65G 17/38*    (2006.01)

(52) U.S. Cl. .......................................... 198/850; 59/4

(58) Field of Classification Search .............. 198/850, 198/851, 853; 59/4; 474/231
See application file for complete search history.

(56) References Cited

U.S. PATENT DOCUMENTS

| 5,465,568 | A | * | 11/1995 | Wang | 59/4 |
| 6,138,820 | A | * | 10/2000 | Ewert | 198/850 |
| 6,782,687 | B1 | * | 8/2004 | Mingers | 59/4 |
| 2006/0196755 | A1 | * | 9/2006 | Burkhard | 198/850 |

* cited by examiner

*Primary Examiner*—James R. Bidwell
(74) *Attorney, Agent, or Firm*—Rosenberg, Klein & Lee

(57) ABSTRACT

A derailleur drive chain structure for downhill event operating in conjunction with a gear disk includes inner chain plates, outer chain plates, sleeves, and pins. Each sleeve is disposed between each pair of inner chain plates. Each pin is to connect each pair of abutted outer and inner chain plates. Two ends are provided on a first side of each outer chain plate. The outer edge of each outer chain plate externally to the two ends is disposed with a protruding portion to improve tensile strength and flexibility of the chain to upgrade its impact withstanding performance for improving riding safety.

16 Claims, 9 Drawing Sheets

A-A (1)

DERAILLEUR DRIVE CHAIN STRUCTURE FOR DOWNHILL EVENT

BACKGROUND OF THE INVENTION (a) Field of the Invention

The present invention relates to a derailleur drive chain structure for downhill event, and more particularly to one having a protruding portion provided on each outer chain plate to improve tensile strength of the chain.

(b) Description of the Prior Art

As illustrated in FIG. 9 of the accompanying drawings, a chain (6) of a bike when operates, a sleeve (62) of a chain plate (61) fully contacts a tooth root (72) of a chain tooth (71), and a first side (611) of the chain plate (61) (including an inner chain plate and an outer chain plate) that stays closest to the chain tooth (71) of a sprocket (7) when contacting the tooth root (72) of the chain tooth (71) must not contact the sprocket (7) to prevent the chain plate (61) from being lifted by the sprocket (7) or its chain tooth (71) because the lifted chain plate (61) will result in instantaneous disengagement of the chain (6) from the sprocket (7) or incomplete engagement between the chain (6) and the sprocket (7) to endanger the safety of the rider of the bike.

As for the multi-stage speed variable chain adapted to a bike for downhill event, safety concerns become more important due to the bike rides much faster. Accordingly, while requiring precise positioning of the speed variation, the chain must be provided with extremely tough tensile strength. The impact withstanding strength is also much greater than the general speed variable chain. Therefore several ways to increase the strength of the speed variable chain, including:

1. getting the chain thicker; or
2. enlarging the diameter of each pivoting end on both sides of the chain plate.

Taking the 9-speed variable flywheel for example, as limited by 2.56 mm of the clearance between both flywheel plates, 1.76 mm of the thickness of the gear, and approximately 0.5 mm of the pitch of the smallest tooth root among the flywheel plates, the total height of the chain is limited to 6.6 mm. Furthermore, the outer edges of both pivoting ends on both sides of the chain plate (6) are symmetric to the center, and the chain plate (6) can only be thickened to a certain extent for being subject to those same conditions that constrain the total height of the chain. Whereas the total height of the chain is prevented from getting greater than 6.6 mm, the attempted increase of the diameter of each pivoting end on both sides of the chain plate is also limited because the diameter is prevented from getting greater than 4.25 mm; otherwise, each pivoting end will hit the bottom of the smallest flywheel plate. Therefore, it is very difficult to increase the strength of the chain.

SUMMARY OF THE INVENTION

The primary purpose of the present invention is to provide a speed variable chain structure for the downhill event to solve the problems found with the prior art by having a protruding portion on each outer chain plate to improve tensile strength and flexibility of the chain to upgrade its impact withstanding performance and riding safety.

To achieve the purpose, the present invention is adapted to a gear disk and comprises inner chain plates, outer chain plates, sleeves, and pins. Each inner chain plate is arranged with two together as a pair set. Each outer chain plate disposed on the outer side of the inner chain plate is also arranged with two together as a pair set. One side of each outer chain plate closer to the bottom of the gear disk is a first side having two ends; and the outer edge of the outer chain plate externally to the two ends is provided with a protruding portion. The sleeve is disposed between each pair of inner chain plates; and the pin is pivotally connected to each pair of abutted outer and inner chain plates.

A protruding wall is provided on the first side of each outer chain plate.

The present invention provides the following advantages:

1. There is no need to increase the thickness of the chain because the chain will not hit the neighboring flywheel plate in the course of varying the speed, therefore, no noise will be produced.
2. The protruding wall helps faster and more reliable achievement of positioning for the speed varying function.
3. The increased tensile strength and flexibility renders the strength of the chain to sustain a force greater than 1200 kg (approximately 850 kg in case of the ordinary chain).

DETAILED DESCRIPTION OF THE PREFERRED EMBODIMENTS

Figure 1:
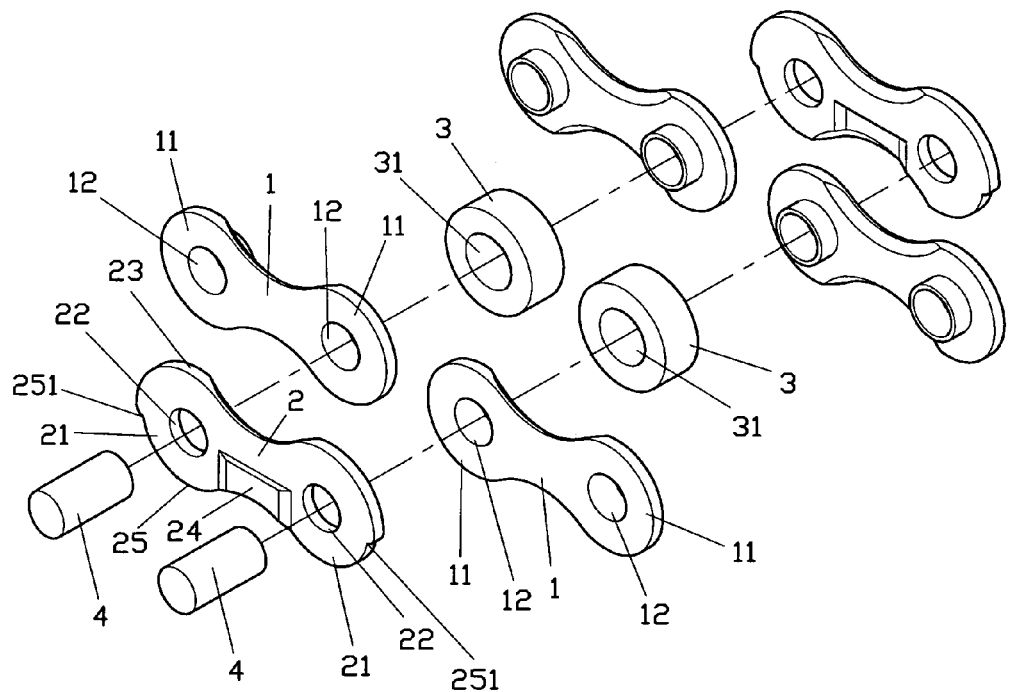
FIG. 1 is an exploded view of a preferred embodiment of the present invention.

Referring to FIG. 1, a preferred embodiment of the present invention comprises inner chain plates (1), outer chain plates (2), sleeves (3), and pins (4), which operates in conjunction with a gear disk (5).

The inner chain plate (1) is arranged with two together as a pair set. Each of both sides of the inner chain plate (1) is provided with a pivoting end (11). A first pivoting hole (12) is disposed on each pivoting end (11).

The outer chain plate (2) is also arranged with two together as a pair set disposed on the outer side of the inner chain plate (1). Each of both sides of the outer chain plate (2) is provided with a pivoting end (21). A second pivoting hole (22) is disposed on each pivoting end (21). One side of the outer chain plate (2) closer to the bottom of the gear disk (5) is a first side (25) having two ends (251). The outer edge of the outer chain plate (2) externally to the two ends (251) is provided with a protruding portion (23), and a protruding wall (24) is disposed on the first side (25) of the outer chain plate (2).

Each sleeve (3) is disposed between the first pivoting holes (12) of each pair of inner chain plates (1) and provided with a third pivoting hole (31).

Each pin (4) is to connect the inner chain plates (1), the outer chain plates (2) and the sleeve (3).

Figure 2:
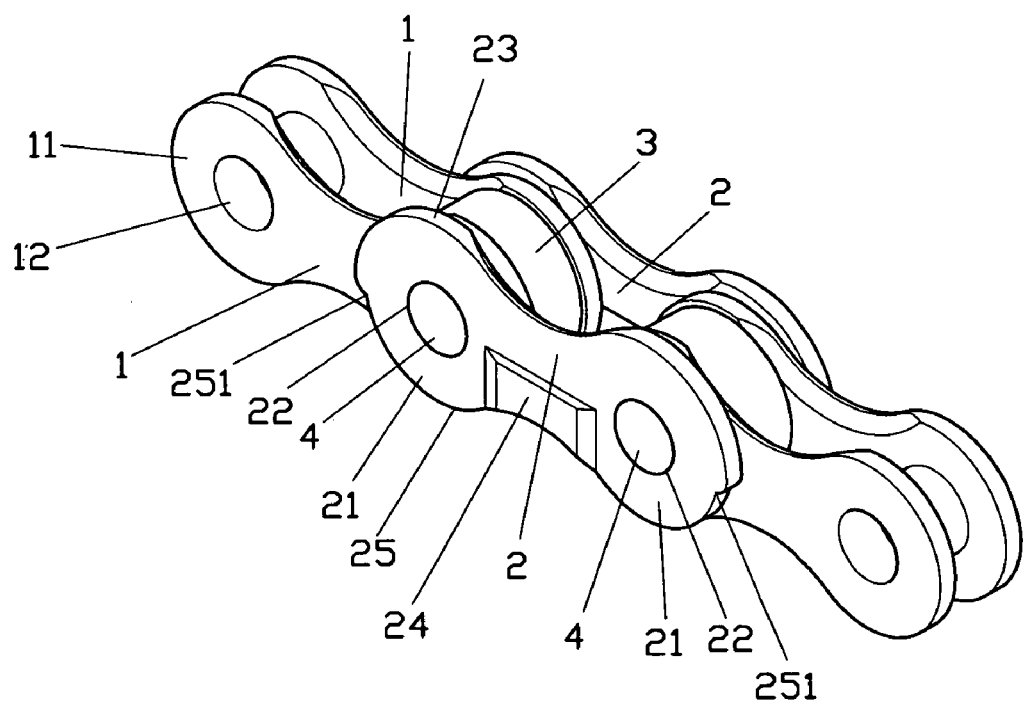
FIG. 2 is a perspective view of an assembly of the preferred embodiment of the present invention.

When assembled as illustrated in FIG. 2, each pair of inner chain plates (1) is placed relatively facing to each other with the outer side of each pivoting end (11) of the inner chain plate (1) resting upon the corresponding pivoting end (21) of the outer chain plate (2). The sleeve (3) is disposed on the inner sides of the inner chain plates (1), and the pin (4) penetrates through the first pivoting holes (12) of the inner chain plates (1), the second pivoting holes (22) of the outer chain plates (2), and the third pivoting hole (31) of the sleeve (3) to connect the inner chain plates (1), the outer chain plates (2) and the sleeve (3) together. Accordingly, by connecting multiple inner chain plates (1), outer chain plates (2), and sleeves (3) in series, a loop of chain is formed.

Figure 3:
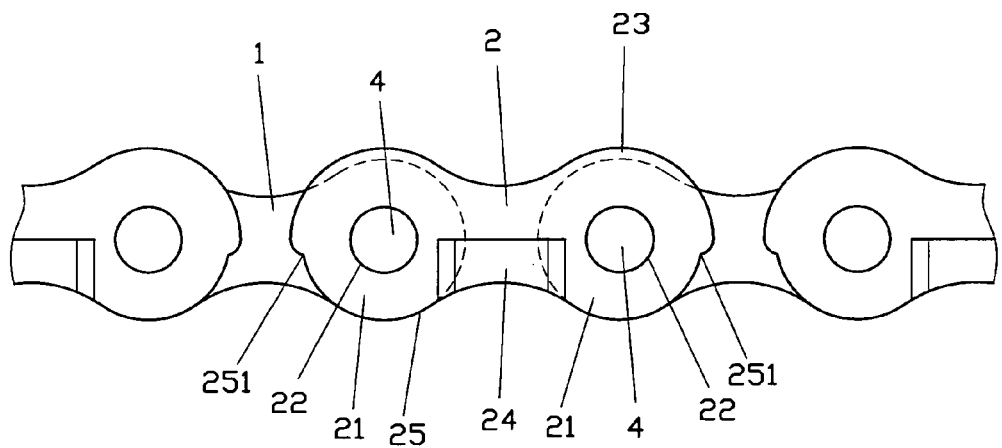
FIG. 3 is a side view of the assembly of the preferred embodiment of the present invention.

Now referred to FIG. 3, the shape of the protruding portion (23) of the outer chain plate (2) is significantly indicated. The protruding portion (23) improves the tensile strength and flexibility of the drive chain so as to promote its impact withstanding strength in conjunction with a nine-speed variable flywheel for upgrading its safety.

Figure 4:
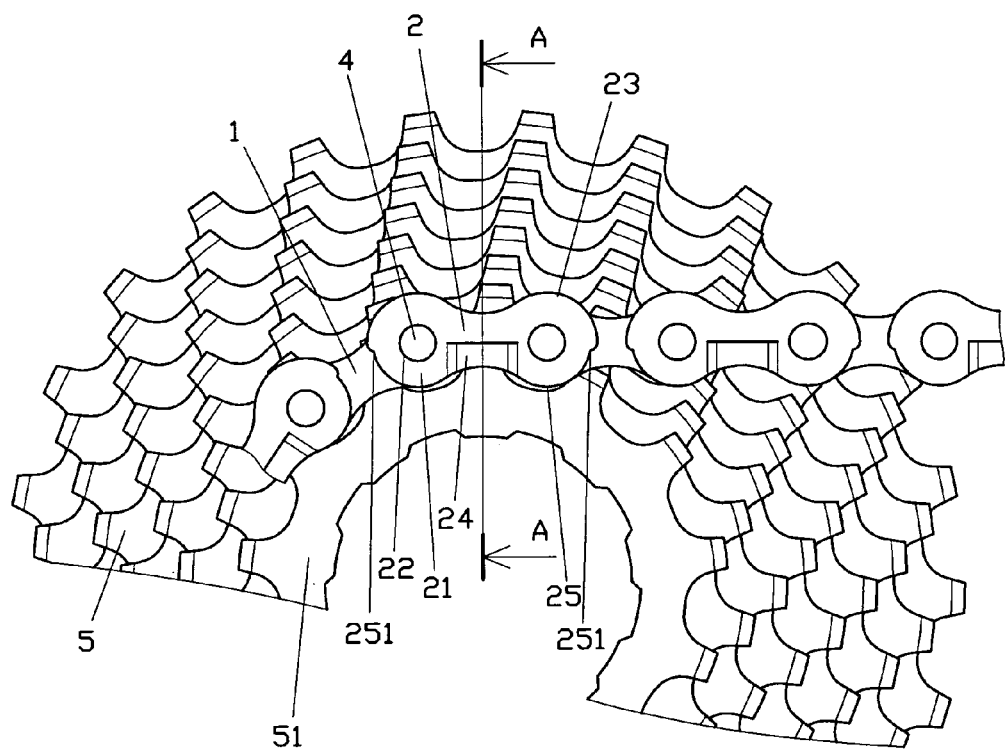
FIG. 4 is a schematic view showing a status of the combination of the preferred embodiment and the smallest flywheel plate.
Figure 5:
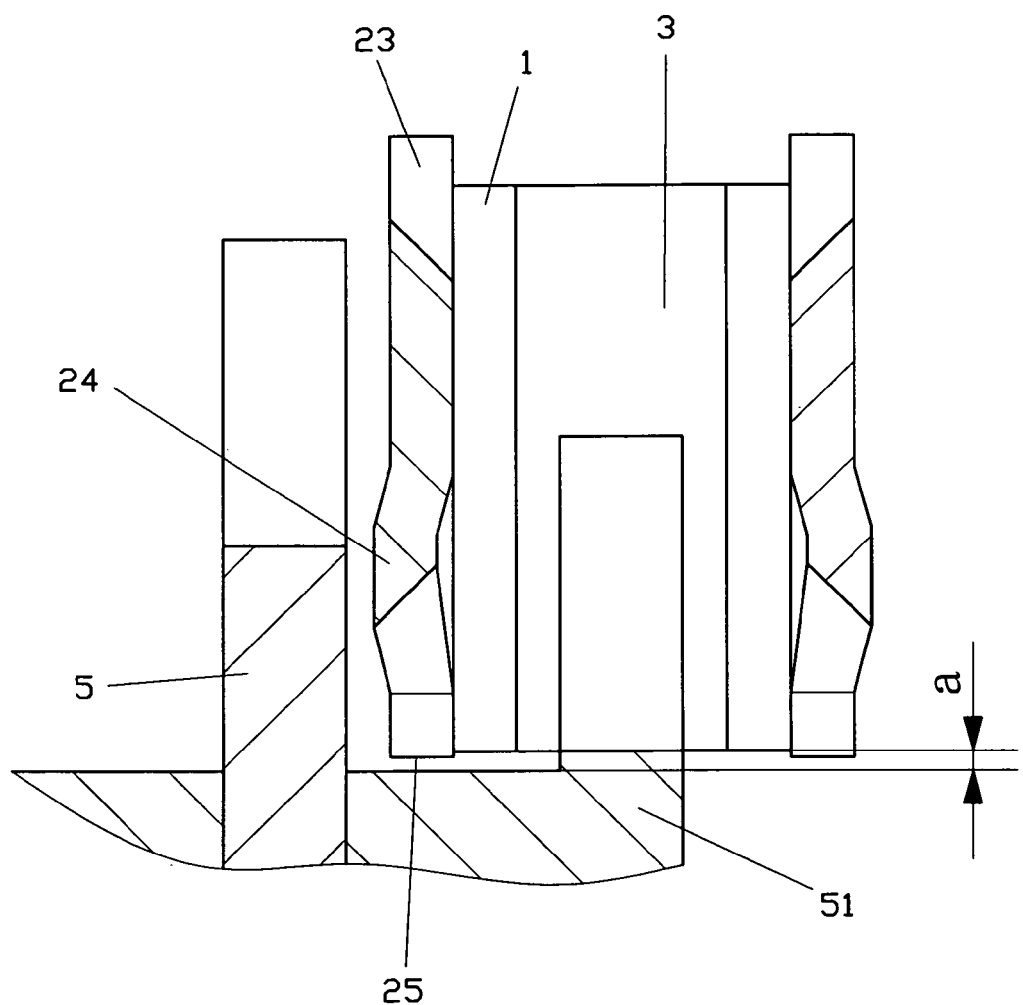
FIG. 5 is a sectional view showing a local part of the combination of the preferred embodiment of the present invention.

FIG. 4 shows the combination of the drive chain and a smallest flywheel plate (51), and FIG. 5 is a sectional view showing a local part of the combination illustrated in FIG. 4. Whereas the clearance between each tooth root of the smallest flywheel plate (51) provided on its outer peripheral a total of eleven teeth and the smallest flywheel plate (51) is very small at approximately 0.5 mm as designated by size a in FIG. 5, the protruding portion (23) provided on the single side of the outer chain plate (2) is capable of increasing the tensile strength of the drive chain without hitting the root of the tooth.

Figure 6:
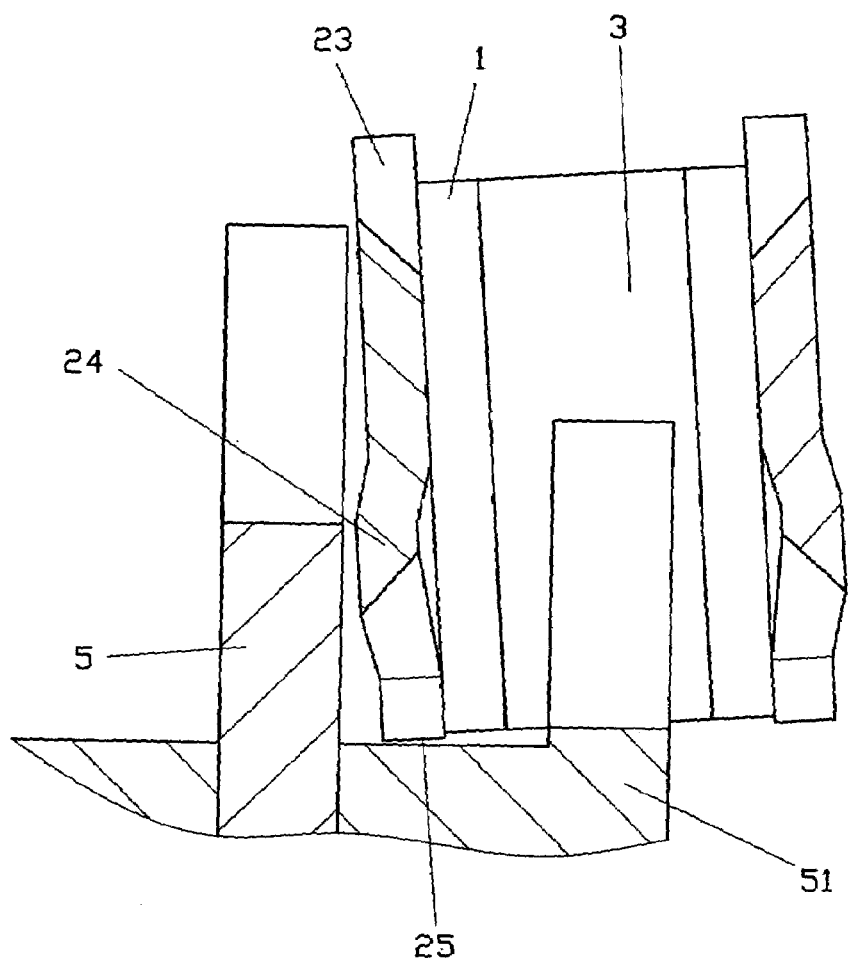
FIG. 6 is a schematic view showing a mild deformation of the preferred embodiment of the present invention.

The protruding wall (24) provided on the first side (25) of the outer chain plate (2) that contacts the bottom of the gear disk (5), as illustrated in FIG. 5, helps faster and more reliable achievement of positioning for the speed varying function. As illustrated in FIG. 6, the drive chain in the course of varying speed while moving is found mild deformation. The protruding wall (24) disposed on single side of the outer chain plate (2) prevents the drive chain from hitting its neighboring flywheel plate. Consequently, no noise is produced in the course of varying speed.

Figure 7:
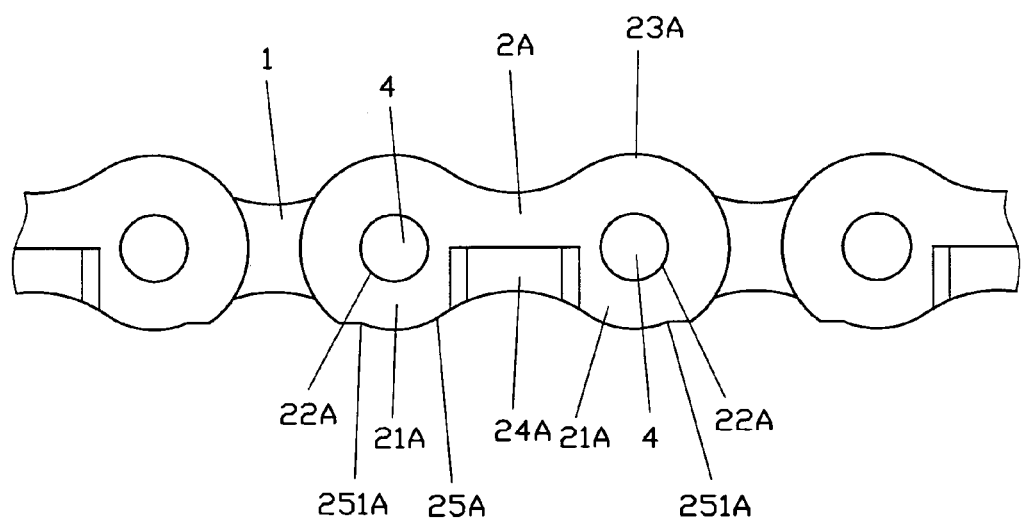
FIG. 7 is a side view of a combination of another preferred embodiment of the present invention.

In another preferred embodiment of the present invention as illustrated in FIG. 7, the drive chain includes the inner chain plates (1), outer chain plates (2A), the sleeves (3), and the pins (4). Each outer chain plate (2A) is provided with pivoting ends (21A), second pivoting holes (22A), a protruding portion (23A), and a protruding wall (24A). The protruding portion (23A) is provided to cover the entire outer edge of the outer chain plate (2A) from the outer side to two ends (251A) of a first side (25A) of the outer chain plate (2A) without affecting the engagement between the chain and a sprocket to allow the complete contact between the sleeve (3) and the tooth root of the sprocket and yield the optimal reinforcement strength.

Figure 8:
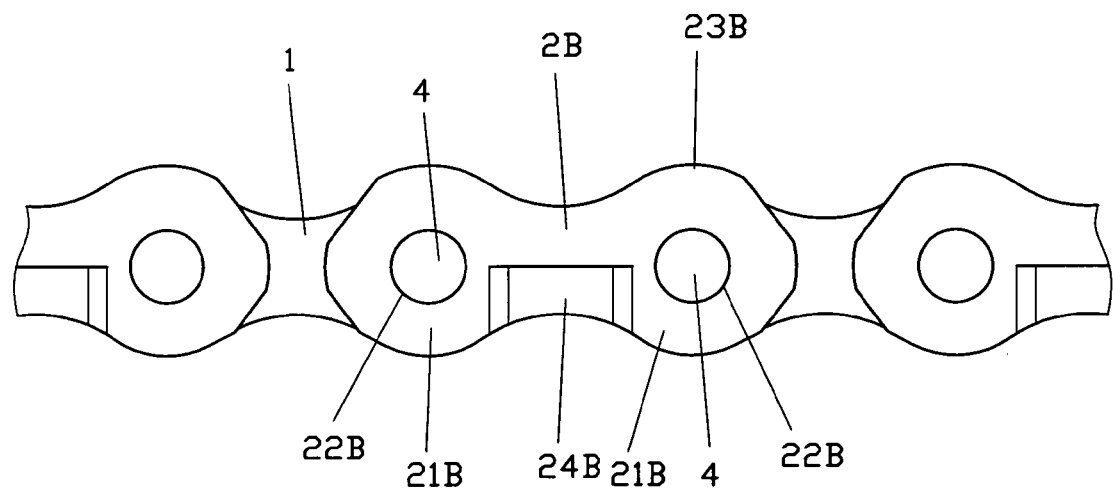
FIG. 8 is a side view of a combination of another preferred embodiment of the present invention.
Figure 9:
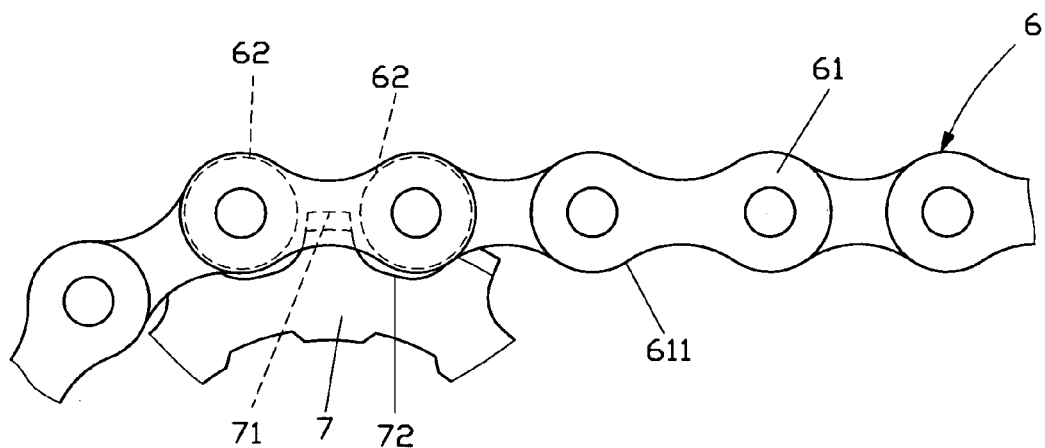
FIG. 9 is a side view of a combination of the prior art.

As illustrated in FIG. 8, another preferred embodiment of the present invention includes the inner chain plates (1), outer chain plates (2B), the sleeves (3), and the pins (4). Each outer chain plate (2B) is provided with pivoting ends (21B), second pivoting holes (22B), a protruding portion (23B), and a protruding wall (24B). The protruding portion (23B) only partially covers up the outer edge of the outer chain plate (2B) without affecting the engagement between the chain and a sprocket to allow the complete contact between the sleeve (3) and the tooth root of the sprocket, reinforced strength, and reduction of the weight of the plates.

Furthermore, both the upper and lower portions on the middle section inside the inner chain plate (1) and the outer chain plate (2) are rounded (without designated numbers in Specification and the accompanying drawings). The rounded angle facilitates the fast and reliable shift of the drive chain to be guided into the upper deck or the lower deck of the flywheel.

What is claimed is:

1. A derailleur drive chain structure for downhill event operating in conjunction with a gear disk comprising:
    at least a pair of inner chain plates;
    at least a pair of outer chain plates, said outer chain plates being disposed on outer sides of the inner chain plates;
    at least a pair of sleeves, being disposed between each pair of inner chain plates;
    at least a pair of pins, said pins being pivotally connected to each pair of abutted outer and inner chain plates, said outer chain plates having an upper and a lower portion, one of said portions having greater radius than the other portion.

2. The derailleur drive chain structure for downhill event of claim 1, wherein a protruding wall is provided on an outside face of each outer chain plate.

3. The derailleur drive chain structure for downhill event of claim 2, wherein said protruding wall is chamfered on at least two lateral sides thereof.

4. The derailleur drive chain structure for downhill event of claim 3, wherein said protruding wall defines a planar section, and three angular facets.

5. The derailleur drive chain structure for downhill event of claim 1, wherein at least the inner chain plates are chamfered on at least an inner lower midsection thereof.

6. The derailleur drive chain structure for downhill event of claim 1, wherein said upper portion of said outer chain plate is chamfered.

7. A derailleur drive chain structure comprising:
    a pair of sleeves arranged in parallel axially;
    a pair of inner chain plates disposed on opposing axial ends of said pair of sleeves, said chain plates including:
        a pair of arcuate end sections, each arcuate end section defining a through-hole therethrough; and
        an elongate portion longitudinally connecting said pair of arcuate end sections;
    a pair of outer chain plates, each of said outer chain plates longitudinally connecting two adjacent inner plate sections pivotally, said outer chain plates having an extended flange, whereby, the radius of each arcuate end section of said outer chain plates is increased relative to said inner chain plates; and
    a plurality of pins, each pin passing through each through-hole.

8. The derailleur drive chain structure of claim 7, wherein a protruding wall is provided on the outside face of each outer chain plate.

9. The derailleur drive chain structure of claim 8, wherein said protruding wall is chamfered on at least two lateral sides thereof.

10. The derailleur drive chain structure of claim 9, wherein said protruding wall defines a planar section and three angular facets.

11. The derailleur drive chain structure of claim 7, wherein at least the inner chain plates are chamfered on at least an inner lower midsection thereof.

12. A derailleur drive chain structure comprising:
a pair of sleeves arranged in parallel axially;
a pair of inner chain plates disposed on opposing axial ends of said pair of sleeves, said chain plates including:
   a pair of arcuate end sections, each arcuate end section defining a through-hole therethrough; and
   an elongate portion longitudinally connecting said pair of arcuate end sections;
a pair of outer chain plates, each of said outer chain plates longitudinally connecting two adjacent inner plate sections pivotally, said outer chain plates having an upper and a lower portion, one of said portions having radii of arcuate end sections greater than the radii of arcuate end sections of the other portion; and
a plurality of pins, each pin passing through each through-hole.

13. The derailleur drive chain structure of claim 12, wherein a protruding wall is provided on the outside face of each outer chain plate.

14. The derailleur drive chain structure of claim 13, wherein said protruding wall is chamfered on at least two lateral sides thereof.

15. The derailleur drive chain structure of claim 14, wherein said protruding wall defines a planar section and three angular facets.

16. The derailleur drive chain structure of claim 12, wherein at least the inner chain plates are chamfered on at least an inner lower midsection thereof.

* * * * *